(12) United States Patent
Klefenz

(10) Patent No.: US 6,442,510 B1
(45) Date of Patent: Aug. 27, 2002

(54) METHOD AND APPARATUS FOR DETERMINING TRANSIT-TIME DIFFERENTIALS FOR SIGNAL WAVEFORMS FOR REAL-TIME PATTERN RECOGNITION, LOCALIZATION AND MONITORING OF OPTICAL AND ACOUSTIC SIGNALS

(76) Inventor: Frank Klefenz, #23, Q2, D-68161 Mannheim (DE)

( * ) Notice: Subject to any disclaimer, the term of this patent is extended or adjusted under 35 U.S.C. 154(b) by 0 days.

(21) Appl. No.: 09/530,956
(22) PCT Filed: Nov. 13, 1998
(86) PCT No.: PCT/DE98/03339
§ 371 (c)(1),
(2), (4) Date: Jun. 2, 2000
(87) PCT Pub. No.: WO99/26167
PCT Pub. Date: May 27, 1999

(30) Foreign Application Priority Data

Nov. 17, 1997 (DE) .......................................... 197 50 835

(51) Int. Cl.[7] ............................ G06F 17/00; G01S 3/80; G01N 29/00
(52) U.S. Cl. ........................... 702/189; 73/589; 367/125
(58) Field of Search ..................... 702/189, 39; 73/587, 73/592, 40.5 A, 601; 367/118, 125, 127, 129

(56) References Cited

U.S. PATENT DOCUMENTS 5,417,113 A * 5/1995 Hartley ........................ 73/587

OTHER PUBLICATIONS

Lazzaro et al. "Silicon Auditory Processors as Computer Peripherals" IEEE Transactions on Neural Networks, Bd. 4, Nr.3, May 1993, pp. 523–527.*

* cited by examiner

Primary Examiner—Kamini Shah
(74) Attorney, Agent, or Firm—Clark & Brody

(57) ABSTRACT

A method includes the steps of segment-wise detecting and bringing into coincidence signal waveforms for conversion into monotone and continuous trajectories for real-time pattern recognition, localization, and monitoring optical and acoustic signals. The method also determines transit-time differentials, wherein pre-programmed key signals are detected by signal sampling, data is correlated from the sampled signals, and pairs of signal combinations of given signal transit-time differentials from the coincidence of the detected signals are determined. The apparatus includes at least two receivers for generating sequences of digital values from incoming acoustic signals, vector generators to convert the digital values into input vectors (7), a signal detection unit (C1) downstream from each vector generator and having parallel, programmable signal-flow chains and adder/comparator units (1, 10) mounted perpendicularly to the signal-flow chains at equidistant spacings, and a multi-coincidence unit (C2) consisting of two antiparallel shift-register forming flipflop chains and an AND gate (20).

13 Claims, 6 Drawing Sheets

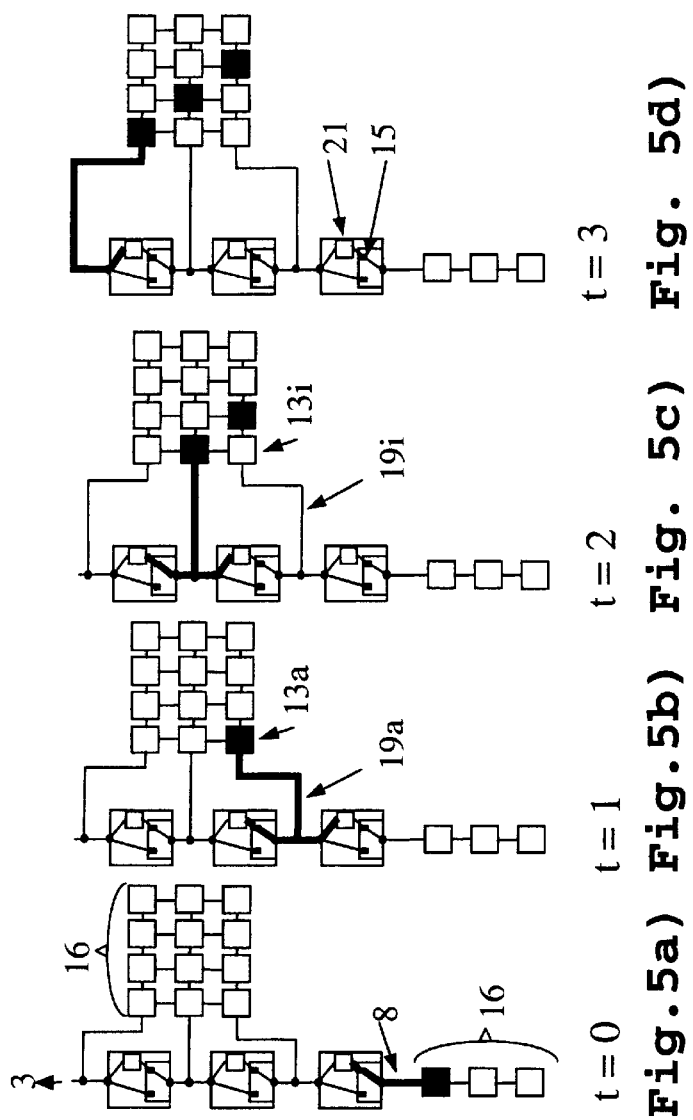
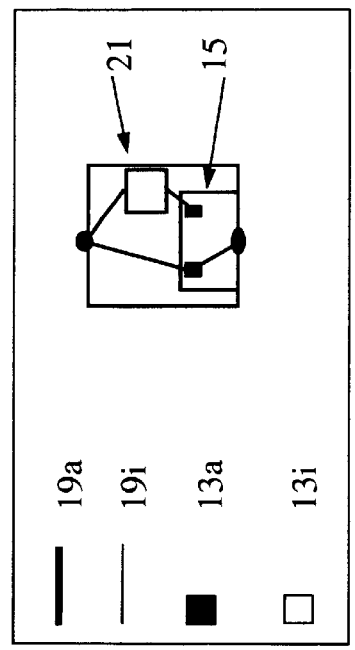

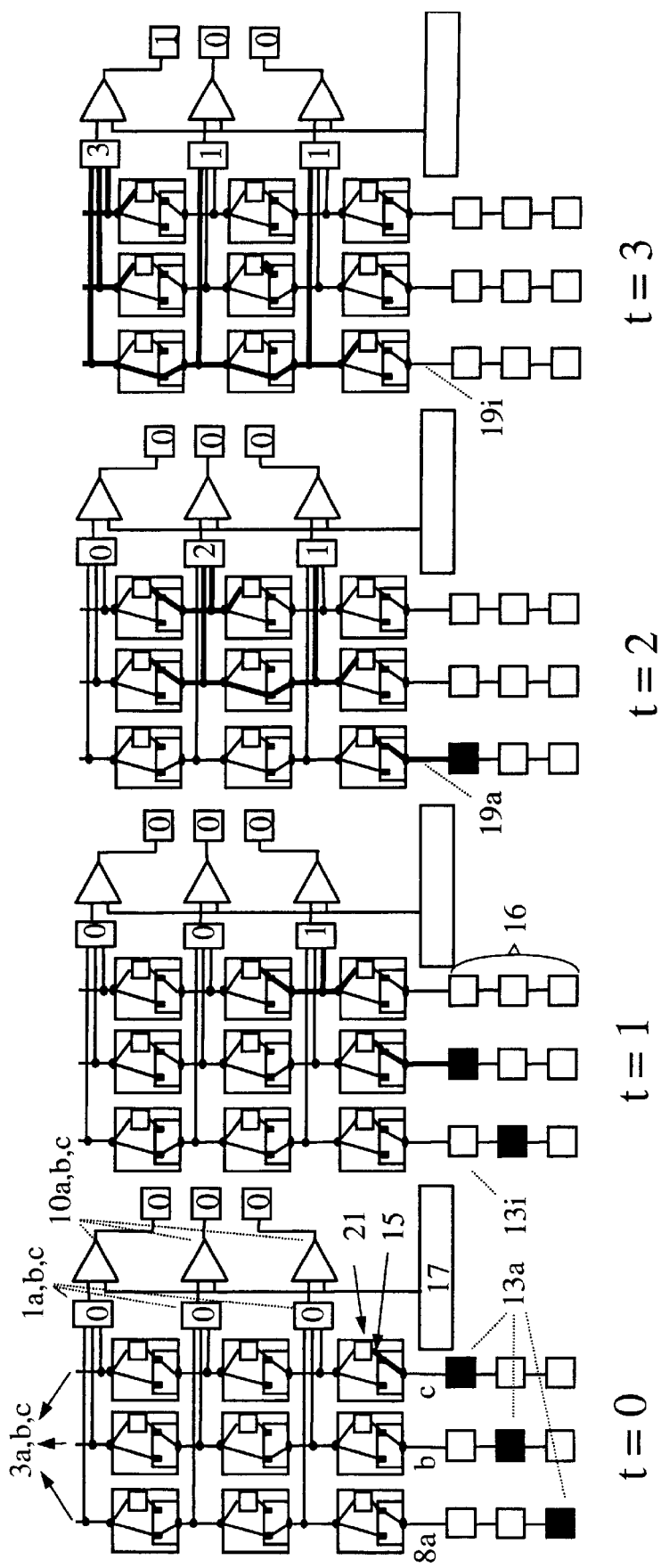
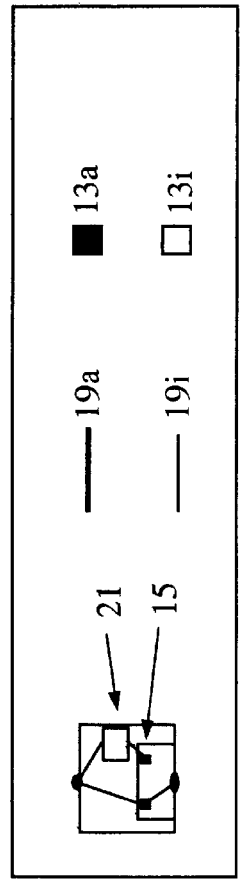
Fig. 6a) t = 0
Fig. 6b) t = 1
Fig. 6c) t = 2
Fig. 6d) t = 3

METHOD AND APPARATUS FOR DETERMINING TRANSIT-TIME DIFFERENTIALS FOR SIGNAL WAVEFORMS FOR REAL-TIME PATTERN RECOGNITION, LOCALIZATION AND MONITORING OF OPTICAL AND ACOUSTIC SIGNALS

DESCRIPTION

1. State of the Art

The invention relates to a method and apparatus to segment-wise detect and bring into coincidence signal waveforms which can be converted into monotone and continuous trajectories, in particular for purposes of real-time pattern recognition, of position finding and determination of transit-time differentials. Said signals are sample in time-discrete manner at the input side, are detected by correlation and thereupon the signal transit-times of different pairs of signal combinations and of different signal waveforms will then be determined.

The invention also relates to apparatus implementing such a method.

A procedure of the above kind used in signal detection is based on conventional template matching wherein the input signal is correlated with a pre-stored reference signal. By means of time-discrete sampling, the signal is rendered as a sequence of input vectors which form a matrix within which the signal is determined by the sum of all matrix pixel positions. In this matrix, correlation is determined by counting the coincident pixel positions between the input and the reference signal. This procedure is modified in time-sequence template matching in that an input vector is correlated with the search vector in each clock step and the partial results are stored in a memory and are summed after n clock steps into a total correlation result.

Time-sequence template matching is expanded into a parallel multi-template procedure with n search patterns by replicating the correlation unit n-fold and by mounting n correlation units next to each other. The input vectors pass through the correlation units and the correlation of an input vector with the comparison vector is carried out in each correlation unit.

A translationally invariant parallel, multi-template matching procedure is known from "Lazzaro, J. and Mead, C, 'A silicon model of auditory localization' (1989), Neural computation, 1, pp 47–57". Therein the transit-time differential of acoustic signals is determined in two coupled functional units, namely an analog silicon cochlea which simulates the properties of a cochlea in biological systems and a subsequent correlation unit. At the input side, the silicon cochlea receives signals which drive the silicon cochlea into an energized state. Depending on the drive signal, sensors mounted equidistantly along the cochlea are actuated which relay the standard pulses to the subsequent correlation unit. This apparatus operates pairwise and the standard pulses received from the right or left cochlea pass through an antiparallel correlation unit consisting of two sets of antiparallel delay lines, each pair of delay lines being combined at the same sensor position. AND gates are mounted equidistantly along the delay lines and sample the signal status of the delay lines and, in the event of coincidence caused by standard pulses simultaneously incident on the AND gate, generate a coincidence signal at the gate output. The correlation unit determines the coincidences of the standard pulses at each pair of lines and the number of coincidences along the same positioning of the AND gates in the direction of the delay lines is counted. The output is a vector of signal-transit differentials per clock step. Accordingly the known procedure is based on simulating a cochlea and determining coincidences along analog delay lines.

Furthermore U.S. Pat. No. 5,417,113 discloses a procedure allowing to localize sound sources by means of test data from several silicon cochlea. The microphone signals are fed pair-wise to several silicon cochlea carrying out a 2-D correlation along predetermined delay lines. The detected coincidences are fed from the particular silicon cochlea to a subsequent 3D analyzer which, upon comparing the characteristic signatures of the 2D output data, results in improved localization of the sound source.

2. Drawbacks of the State of the Art

The conventional template-matching procedures incur the drawback that they fail to be invariant in the presence of spatial shifts. Only a signal sequence present at the same time of synchronization at which the correlation between input and comparison vector is started will result in maximum correlation. If the correlation between the input and the comparison vector is shifted by one or more sequences, the image and search patterns no longer coincide.

The known translationally invariant, parallel, multi-template matching procedures used to determine the transit-time differential of acoustic signals incur the drawback of the complex simulation of a biological cochlea, in particular in tuning the response of the cochlea to different energizing signals by varying the relevant parameters describing the cochlea.

Another drawback resulting from the circuitry of the heretofore designed analog configurations is the adjustment, subject to manufacturing tolerances, of the delay speeds in the analog delay lines subject.

The heretofore predominantly employed digital signal processors (DSP's) incur a drawback in that they do not properly match the present problem's solution contained in the method and apparatus of the invention. A DSP is incapable of solving said problem of a defined magnitude within an adequately short time, and in many cases such inability may entail problems.

A further general drawback of the DSP's prevailingly used to-date for signal processing and pattern recognition is that the procedure and the apparatus poorly match the above solution to the problem addressed herein. A DSP is incapable of solving such a problem of a defined magnitude at the same time as the method and apparatus herein disclosed. The DSP architecture cannot process the signal flows in the manner of the method and apparatus of the invention.

Another general drawback of the DSP's is the central control unit and the scarcity of computers able to process the data flows in the manner of the method and apparatus of the present invention. As regards digital signal processors, instructions are stored in the computers, operands are retrieved, and results are filed in registers. Because of its fixed CPU architecture, a digital signal processor is unable to simulate the apparatus' signal-flow architecture at which the signal flows pass in time though said apparatus.

OBJECTIVE OF THE INVENTION

The objective of the invention is to create a method and apparatus to segment-wise detect and bring into coincidence signal waveforms which can be converted into monotone and continuous trajectories, in particular to recognize patterns in real time, to localize and to monitor optical and acoustic signals, and to determine transit differentials with increased accuracy of measurement by making it possible to program the key waveforms and the resolution.

Another objective of the invention is to accelerate calculations in order to include several domains of application of real-time pattern recognition.

EXAMPLES

In the method of the invention, first pattern recognition is carried out and then the determination of the transit-time differential by detecting key waveforms, and the information is processed further in a subsequent multi-coincidence unit; shift-invariant, parallel multi-template matching is carried out during which key waveforms are correlated in parallel and an output per clock step, illustratively of a set of transit-time differentials, is created in the said subsequent multi-coincidence unit.

The method to segment-wise determine pattern recognition and transit-time differentials of signal waveforms which can be converted into monotone and continuous space-time trajectories, in particular for purposes of real-time pattern recognition, is characterized in that pre-programmed key signals are detected by signal sampling and processing the sampled data, further by subjecting to multiple coincidences combined signal pairs of different signal transit times and different waveforms. At the input side the signals are sampled in a sequence of input vectors, each input vector consecutively passing through a signal detection unit consisting of parallel, programmable signal-flow paths, a maximum correlation result being achieved in said signal detection unit wherein, by programming the speed of propagation in the signal flow paths, a key signal shall produce, at a given position along the signal flow path by summing all partial results at correlation units orthogonal thereto and mounted at the individual signal nodes, so that, by comparing the correlation result with a programmable threshold value and exceeding this threshold value a detection signal shall be generated, the detection signals from all correlation units subsequently passing through a multi-coincidence unit consisting in each case of pairwise, antiparallel delay lines, and where the impact of two mutually opposite detection signals by means of equidistant configuration of coincidence elements along the delay line generates a coincidence of which the particular spatial location along the delay line encodes the presence of a given transit-time differential of a signal of a particular waveform.

The apparatus implementing the method of the invention is characterized in that signals are sampled at a receiver and are converted into a sequence of input vectors which are processed consecutively in a signal detection unit consisting of programmable chains of signal flows and of adders-comparators mounted orthogonally thereto at equidistant spacings and detecting the particular signal state of the signal flow chains at a given position in this signal flow chain, detection of a signal of a given waveform being implemented by comparing a predetermined threshold value with the correlation result— per clock step— of the related adder/comparator unit, and a standard pulse being generated when the threshold value is exceeded, the sampled standard pulses from all adder/comparator units passing through a multi-coincidence unit consisting of two antiparallel channels of sequential shift registers (antiparallel flip-flop channels), the memory flipflop chains of the adder-comparator units coding the same signal being pairwise combined by connecting each pair of memory flipflops with an AND gate along the memory flipflop chains and the coincidence of two mutually opposite standard pulses at the AND gate output triggering a timed standard pulse which by means of the given timing and the particular spatial position of the AND gate along the memory flipflop chain encodes the presence of a specific transit-time differential of a signal of a given waveform.

ADVANTAGES OF THE METHOD AND APPARATUS OF THE INVENTION

The essential advantages of the method of the invention applied to acoustic pattern recognition and determination of transit-time differentials are that the complex simulation of a silicon cochlea is eliminated. This silicon cochlea is replaced by a signal detection unit of which the time-response to the applied input signal and the selected set of parameters can be specified deterministically in accurate manner.

Another advantage in all pattern-recognition procedures is the programmability of the signal detection unit, whereby programming the signal speeds in the signal flow chains of propagation allows programming the detection of sets of given key signal waveforms. A further advantage is that the resolution of the transit-time differentials following pattern recognition can be varied by fixing the interval of the maximally registrable transit-time differential. Yet another advantage of the method of the invention is that by means of synchronous timing, the speeds of propagation of all signal flow chains can be matched accurately to each other. Another advantage is adaptation to the problem by programming the resolution, thereby attaining higher accuracy of measurement of key signals, as a result of which, by means of the method of the invention, the distance of a signal source from the receiver can be determined at high resolution, also, that by means of said method, the azimuth of a signal source in the receiver plane relative to the receiver can be determined at high accuracy, and again, that by means of the method of the invention, voice and image signals can be detected with high resolution.

The aforementioned advantages of in creased resolution and ability to match special applications obviously also cover other applications of this method. In many physical cases an object moves through a phase space in a characteristic trajectory. Such a path can be detected by the method and apparatus of the invention, Because the said method and apparatus are trajectory-detecting, knowing physical particulars of the phase space, it will be possible to determine an object's relevant parameters such as spatial position, angular position, distance, speed, acceleration etc. Accordingly the applications also include in particular measuring speed and acceleration, compensating deviations from the rest position, tactile pattern recognition, etc.

Because the working time is much less than for the DSP's, the method and apparatus of the invention also are advantageous when monitoring the safety of rapidly evolving processes, for instance relating to aircraft or reactor safety, further in monitoring industrial production facilities or patients in medical care.

The method and apparatus of the invention however are not applicable to such waveforms that cannot be converted into segmented, monotone and continuous trajectories or time series.

An advantage of the application of the invention to circuitry is that conventional electronic circuits may be used and in that the circuit architecture is highly structured. Where needed it may be converted into a regular VLSI chip design because the circuit consists only of three basic elements which when connected form an elementary basic functional unit which might be construed as a basic cell. The VLSI chip is formed by n-fold replication and overlayering and subsequent simple connection of the cells.

The solution of the method of the invention is characterized by the features of claims 1 through 8 and the related circuitry solution of the invention is determined by the features of claims 9 thorough 17.

The further claims 18 through 41 relate to technical fields and equipment which may employ the method and apparatus of the invention.

Further features and advantages of the invention are discussed below in relation to the implementations shown in the drawings.

BRIEF DESCRIPTION OF THE DRAWINGS

FIGS. 5a–5d show the generation of a trajectory by means of time-series of shift sequences, FIGS. 6a–6d show the processing time sequence in the signal detector, in individual steps

DESCRIPTION OF THE PREFERRED EMBODIMENTS

Figure 1:
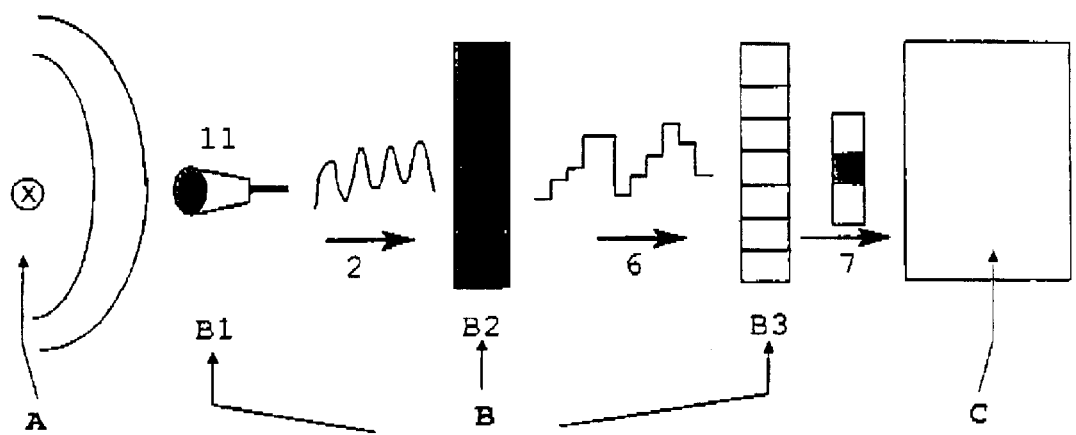
FIG. 1 shows the conversion steps required for an input vector at a single signal receiver (microphone)

FIG. 1 shows the main stages of signal conversion using the method and apparatus of the invention. The signal from a signal source A is conditioned in the signal pre-processing stage B by the signal converter B1, the A/D converter B2 and the input-vector generator B3 for the chip C consisting of the signal detection unit C1 and multi-coincidence unit C2. As shown in this instance, the signal converter B1 may be a microphone 11.

The original signal emitted for instance from an optical or acoustic signal source A is transformed by an opto-mechanical or an electromechanical signal converter B1 into an electric current or voltage function, the analog signal 2 is sampled by the subsequent A/D converter B2 into the discrete digital values of the digital signal 6, and the digital values are converted in the input-vector generator B3 by means of a lookup-table into signal magnitudes specified by the position in the input vector 7. Signal detection unit C1 is the first portion of the chip C and processes per clock step one input vector 7, and its output is one characterizing vector per clock step.

Figure 2:
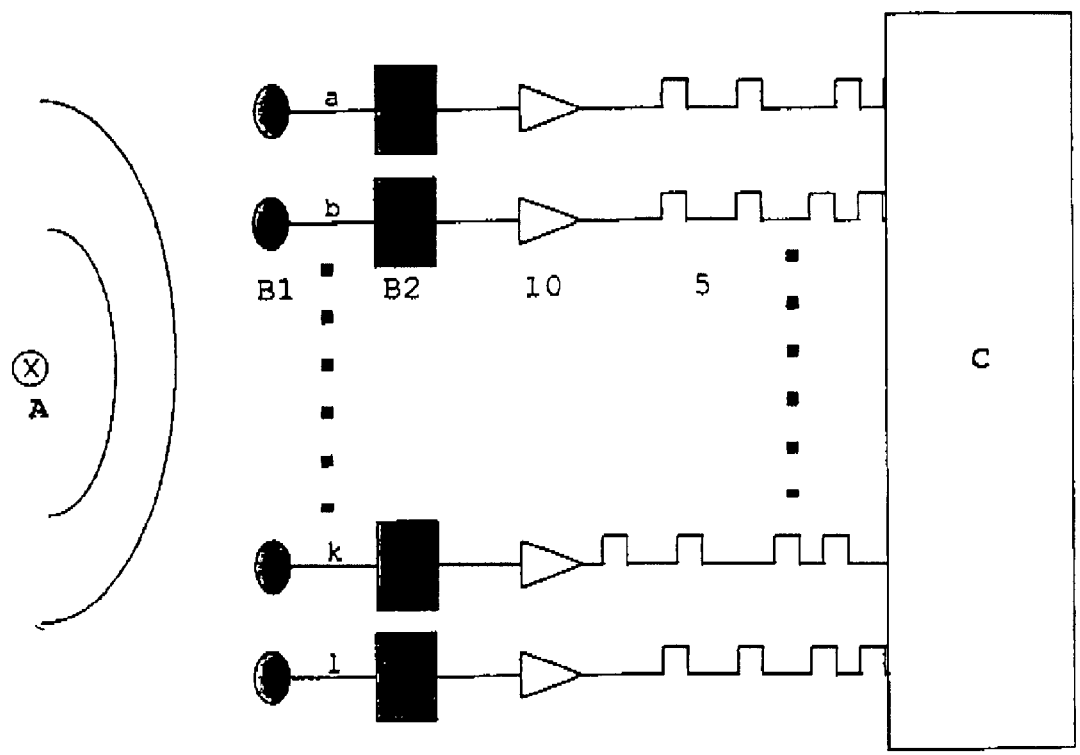
FIG. 2 shows the conversion steps required for parallel signal processing by means of multi-receiver which raises the signal resolution.

Following each test and as shown in FIG. 2, illustratively electric, optical or acoustic signals are registered by the signal converters of a multi-receiver B1a,b–k,l. The multi-receiver's signal converters may be a CCD or photodiode array in the optic case, a wire drift chamber in the electric case and a microphone array or a silicon cochlea or a hydromechanical converter array in the acoustic case. The multi-receiver is determined by the configuration of the signal converters B1a,b–k,l, for instance by a linear array of the signal converters B1a,b–k,l which are equidistant from each other in a multiwire drift chamber or cochlea or a microphone array, and by the speeds of propagation in the ambient medium. Each signal converter B1 of the multi-receiver is identical and generated a continuous flow of signal data. The signal-data flows of the signal converters B1 shall be synchronous after they have passed through the A/D converters B2 and the comparators 10 in the form of bit flows 5 and then are fed into the signal detection unit C1 for the signals to be analyzed therein.

Figure 3:
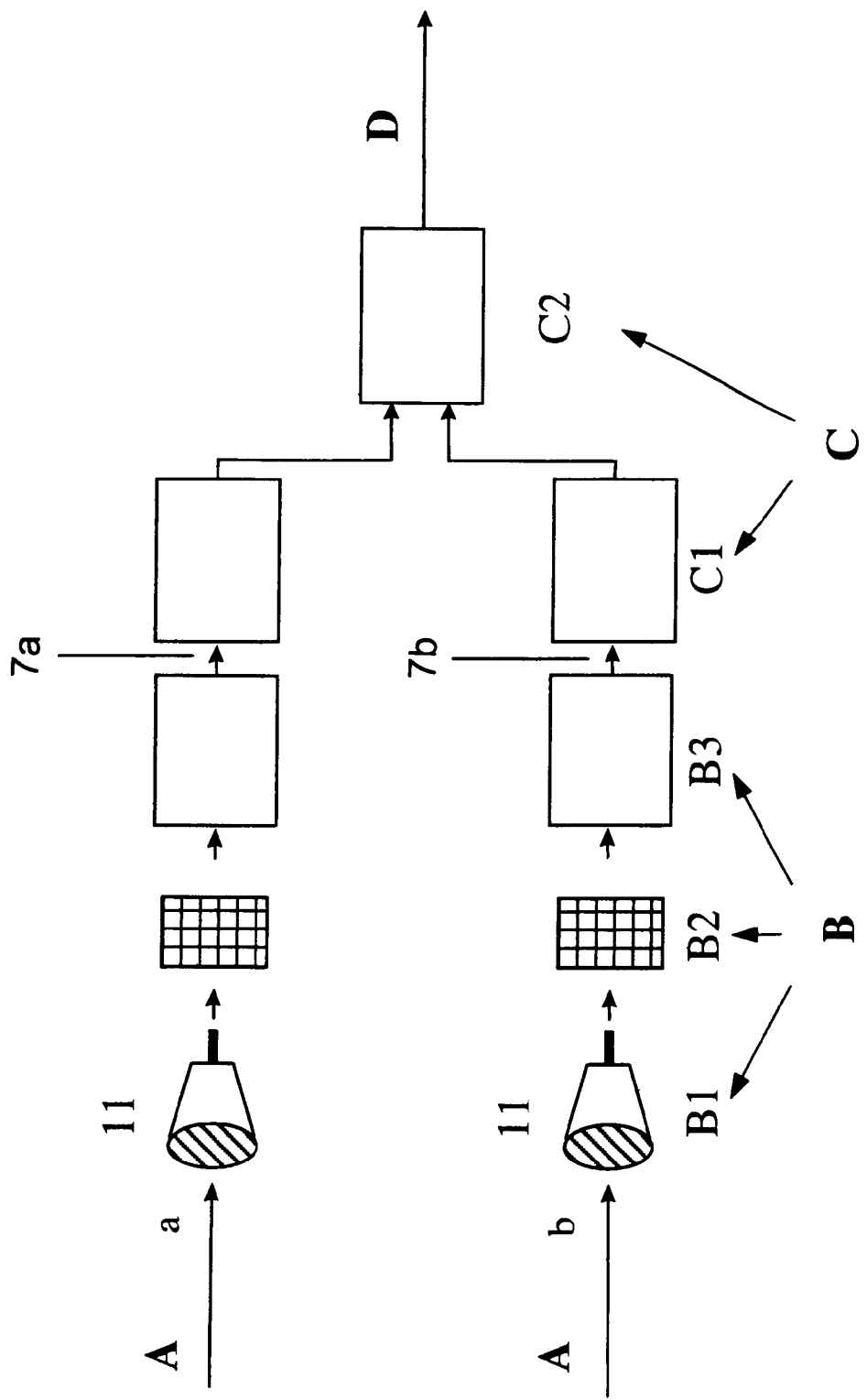
FIG. 3 is a functional diagram of the signal pre-processing stages and of the apparatus of the invention, illustratively to determine the transit-time differential of acoustic signals.

In FIG. 3, two signal pre-processing stages Ba and Bb run in parallel to the system determining transit-time differentials for instance of two acoustic signals. The signal pre-processing stage Ba fitted with the microphone 11a precedes the upper signal detection unit C1a and the signal pre-processing stage Bb fitted with the microphone Bb precedes the lower signal detection unit C1b. Both pre-processing stages Ba and Bb and both signal detectors C1a and C1b are identical. Both processing channels are fed to the multi-coincidence unit C2 at the output of which appears one output vector per clock step, in this instance the signal transit-time differentials. The acoustic transducers (microphones etc) convert the acoustic pressure generated by a signal source A, in this case an acoustic generator, at the signal converters B1a and B1b, into analog electric signals. The subsequent A/D converters B2a and B2b sample the electrical signals in time-discrete manner and each generate a sequence of digital values describing the signal. The input vector generators B3a and B3b each convert the sequences of digital values into a sequence of input vectors 7. In the process the signal is normalized, ie it is made a standard, in relation to the expected maximum signal range. The signal is divided into fixed quantification steps of which the number is determined by the width of the input vector defined as the number of vector elements. The width of each quantification step is determined by the normalization, the number of vector elements and the kind of division (linear, logarithmic etc). The system is fed per clock step with two input vectors 7a and 7b, one in the upper signal detection unit C1a and one in the lower signal detection unit C1b. The input vectors 7a and 7b are processed in parallel in space-time manner in the signal detectors C1a and C1b and in the subsequent coincidence unit C2. The apparatus emits sets of transit-time differentials of different signal waveforms per clock step. The number of sets of transit-time differentials depends on the pre-determined number of programmed reference signal patterns. The number of transit-time differentials which can be emitted per unit time per pair of antiparallel flipflop chains in the coincidence unit C2 is determined by the length of one flip-flop link in turn defined by the number of flipflops constituting one flipflop chain. The emission of 10 transit-time differentials per signal waveform requires a length of 10 of the flipflop chain. The interval length of the transit-time differentials results from the pre-determined transit-time differential. The linear subdivision of the transit-time differential interval follows from the length of a flipflop chain. Signal transit-time differentials follow from the geometry of the acoustic transducer of the receiver. Depending on the position of the acoustic generator in relation to the receiver, the signal shall be registered at different signal incidence times at the signal converter 11a or 11b. By appropriately configuring several systems, the relative spatial position of an acoustic generator to the receiver can be calculated from the resulting signal transit-time differentials, the receiver geometry and the speed of acoustic propagation in the acoustic medium. Parameters such as the relative radial distance between the acoustic generator and the receiver, the height and azimuth of the acoustic generator are computed relative to the direction to the receiver depending on the designs of the particular receivers. The spatial position of the acoustic generator to the receiver is given by the radial distance r between the transmitter and the receiver, angle of elevation alpha (angle of altitude relative to the receiver) and the azimuth beta (horizontal angle with the receiver). The relative coordinates (r, alpha, beta) of the reference system of acoustic generator and receiver are each determined by a separate device. The azimuth (horizontal angle between the receiver axis and the acoustic generator) is derived as a characteristic from the signal transit-time differentials. The azimuth is determined at higher resolution because the signal transit-time differentials can be determined by the system with high resolution. The azimuth-determining device consists of two acoustic transducers mounted at a defined mutual separation. The connecting line between the two acoustic transducers determines the receiver's receiving axis. The azimuth-determining device detects the signal incidence at the signal converter B1$a$, and the time-delayed arrival of the signal at the signal converter B1$b$ determines the transit-time multi-differential between the signal's times of incidence at the signal converters B1$a$ and B1$b$ and from this transit-time differential it derives as a characteristic the azimuth between the plane of the receiver and the acoustic generator, the azimuth being an unambiguous function of the signal transit-time differential.

Figure 4:
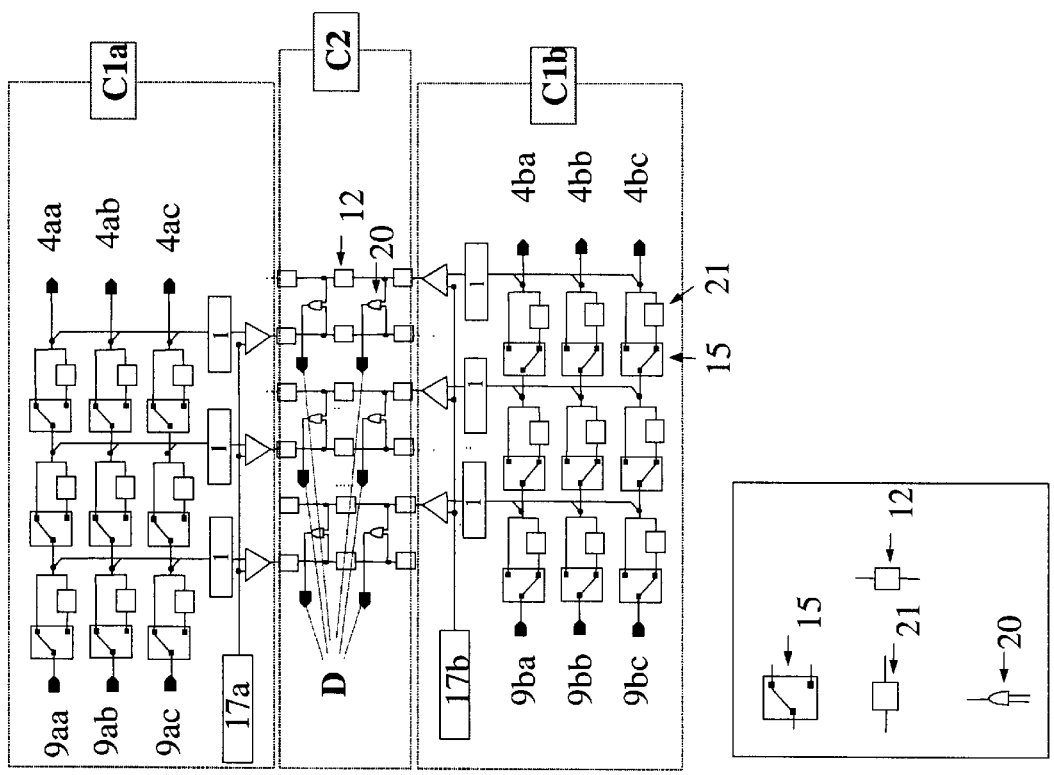
FIG. 4 shows the structure of the apparatus of the invention determining the transit-time differentials for instance of acoustic signals.

FIG. 4 shows an illustrative configuration of the apparatus of the invention consisting of two signal detection units C1 and the subsequent multi-coincidence unit C2. Each signal detection unit C1$a$ and C1$b$ consists of three basic components of a switching/delay cell composed of a programmable switch 15 and a delay element 21, an adder 1 and a comparator 10. As shown in FIG. 4, the signal detection unit consists of an elementary basic structure formed of identical rows by adjoining switching/delay cells and adder/comparator unit. The signal detection unit is built up by layering identical replications of the basic cell.

The upper signal detection unit C1$a$ of FIG. 4 consists of three of these basic rows. The left one of said three basic rows consists of the three switching/delay cells which are in direct contact with the input channels 9$aa$, 9$ab$, 9$ac$, and of the upper left adder 1 and comparator 10.

Each switching/delay cell comprises one input and one output. The switching/delay cells always are sequential and form a signal flow chain. By relaying the signal flow to one output and to the input-side connection, several signal detection units can be channeled and the joined signal flow chains thereby are able to relay the signal flows without interruption. In FIG. 4 there are illustratively three series switching/delay cells in the upper signal detection unit C1$a$ to constitute the signal flow channels 9$aa$–4$aa$, 9$ab$–4$ab$ and 9$ac$–4$ac$.

The switch position within the switching/delay cell is programmed by an associated storage element, namely a flipflop. The flipflop programming of a switch and hence of the signal detection unit may take place when the chip is initialized, but also when there is a break in operation. Accordingly the signal detectors can be reconfigured, they can be programmed on site, during short operational pauses of the duration of a few clock steps.

Depending on the switch position, an incoming signal is relayed to the upper signal path (switch position ON) or to the lower signal path (switch position OFF). In the upper signal path, the signal is directly transmitted from the input of the switching/delay cell to the output. In the lower signal path the signal is applied to the delay element. The upper and the lower signal paths merge again at the output of the switching/delay cell. The segment of a signal path assumes the logic states 0 (no signal) or 1 (signal is present). The adder 1 comprises n inputs, in this instance there are 3 inputs, a particular adder input being connected to a signal node between two switching/delay cells. The adder counts the number of logic 1's at the inputs. The sum is emitted as an n-bit value. The output of the adder 1 is connected to one of the inputs of the comparator 10. A predetermined threshold 17 value is applied to the second input of the comparator 10 and is used for comparison. The comparator 10 compares the output value of the adder 1 with a predetermined threshold value 17 and emits a logic 1 if the value of the adder 1 exceeds the threshold value 17, otherwise it emits a 0. The comparator output is fed to the input of the coincidence unit C2.

The signal detection unit functionally consists of a set of parallel signal flow chains and of the set of adder/comparator units configured perpendicularly thereto. The signal flow chains and the adder-comparators constitute a matrix-like structure of n signal flow chains times m adder/comparator units. Each signal flow chain is actuated at the input side by an incoming standard pulse and generates a given signal flow programmed by the switch positions in the signal flow chain. The signal flow is in the form of a series of signal-shift sequences. A shift sequence is that signal path segment wherein the signal per clock step is simultaneously active (logic 1). The series of shift sequences is determined by the switch positions in the switching/delay cells and can be freely programmed by varying the switch positions and can be reconfigured in programmed manner in operation. A plurality of shift sequences can be programmed. The shift sequences range from the maximum shift sequence Max (depending on the length of the signal flow chain determined by the number of switching/delay cells) wherein all switches are at 1 to the minimal shift sequence 1, wherein two adjacent switches are set at OFF.

Shift-invariant multi-template matching is implemented at the signal detection unit by space-time correlation using a fixed rule of transformation specifying at which time and position an adjusted pixel in the input vector 7 shall be fed to the adder/comparator units.

The transformation rule states that each adjusted pixel in the input vector 7 shall follow a given trajectory in correlation space. Calculation of the trajectories is specified by this transformation rule. The trajectories are determined by the transformation rule as a function of the receiver geometry, acoustic propagation in the medium and maximum transit-time interval and interval subdivision into a time-discrete matrix. This matrix is determined by the sampling interval, the width of the input vector 7 and the number of adder/comparator units. The calculation results in determining the series of shift sequences for all signal flow chains.

FIGS. 5$a$–5$d$ show the spacetime generation of a trajectory, namely a straight line with a slope of 45°, when a signal flow chain moves from the input 8 to the output 3, with the shift sequence of characters (1,1,1 . . . 1) i.e. switch positions (OFF, OFF, OFF . . . OFF). The signal propagates by one shift sequence per clock step. The state of each signal-path segment is registered at the signal nodes by the adder inputs. At time t=0, the signal is applied to the input 8. The next register cell 12 is active 13$a$. At times t=1 and t=2, the signal crosses the signal flow chain and at time t=3 the signal has fully crossed the signal flow chain. A trajectory is determined by its shift sequence, or in equivalent manner by its switch positions in the signal flow chain. Because the switches 15 in the signal flow chain are freely and reconfigurably programmed, a plurality of trajectories may be programmed. The signal flow chains are able to generate all continuous, monotonely ascending trajectories with local slopes larger than 45°. Acoustic generators produce acoustic signals which are continuously and monotonely rising within a limited time window and within segments. Each segment-defined quantized signal of a given time interval determined by the number of switching/delay cells in the signal flow chain and having a local slope less than 45E, can be made to correlate maximally at a given signal detector by fixing the shift sequences in the signal detection unit C1. Signals having a local slope larger than 45E can be converted into signals having a slope less than 45°5 by a pre-transformation in which the maximum interval of the time window and of the sampling interval are varied and hence the recomputation of the signals in the time-discrete matrix is changed, and then may be fed into the signal detection unit. Accordingly the signal detection unit C1 is characterized in that the key signal to be detected can be determined with high accuracy because a first copy of said key signal is programmed into the signal flow chains. The quality of the detection correlation depends on the minimum signal sampling interval and on the statistical fluctuations entailed by discretization. If a signal deviates from the pre-programmed, ideal key signal, then there shall result a weakened correlation within a given variation-width of the signal. The apparatus C furthermore allows programming a set of similar signals and as a result signals distorted by the acoustic medium, such as reflections, also can be detected. Therefore the apparatus C can be used to determine accurately the azimuth, the angular resolution being determined by the minimum time resolution specified in turn by the minimum time interval. As a result the apparatus may serve as a high-resolution alarm which shall be triggered when it registers a key signal of defined width of variation. Moreover said apparatus may be used to ascertain accurately voice tones detected within a given width of variation.

FIGS. 6a–6d show the operation of the signal detection unit C1. n=3 continuous input data flows are processed in parallel and are synchronized by means of a common ordering parameter (time, angle, phase). At each clock step there is one entry of an input vector 7 and one output of a set of signal transit-time differentials.

The signal detection unit implements the specified transformation in that the trajectory in the related signal flow chain is generated in space-time for each correspondingly adjusted pixel in the input vector 7. In the embodiment shown, three signal flow chains are in parallel. The three-part input vector 7 is applied to the inputs 8a,b,c of the parallel signal flow chains. Each adjusted pixel in the instantaneous, applied input vector triggers the generation of the corresponding trajectory in the associated signal flow chain. All adjusted input pixels of the input vector independently of one another generate the corresponding trajectories in the signal flow chains. Several trajectories also may be generated sequentially in the same signal flow chain.

Each signal detector detects the signal activity at the same position in the signal flow chains. The position of the adder input is determined by that switching/delay cell beyond which the signal activity is being detected. Each adder input of an adder/comparator unit at a signal flow chain is situated behind the same number of switching/delay cells. Illustratively the input of the adder 1b is situated behind 2 switching/delay cells, and that of the adder 1a behind 3 switching/delay cells. Each adder/comparator unit 1a,b,c/ 10a,b,c for each clock step sums the signal activities of the connected signal flow chains into one output value. This output value is compared with the predetermined threshold value 17 by means of the comparator unit 10a,b,c and, if the output value is higher than the threshold value 17, it will be emitted as a logic 1. The output 1 specifies that at this time a signal of a given waveform has been detected.

Each adjusted pixel of the input vector 7 triggers a signal wave of a given speed in the signal flow chain. Each signal triggers a signal wave front at the input 8. The signal flow chains are crossed at different shift speeds. The instantaneous shift speed per unit time is determined by the instantaneous shift sequence. Because of the different shift speeds in the signal flow chains, the elementary waves superpose into a wave front which shall be a straight wave front at a given position in the field. The shift speeds are so matched by the transformation rule implemented by the positions of the switching elements in the signal flow chains that a wave front triggered by a desired signal shall be de-warped in the field and transformed at the pertinent signal correlation site into a straight wave front. Each pre-programmed signal is bent at its predetermined correlation site into a straight wave front. A fixed signal correlation coding shall be implemented by adjusting the switching/delay cells. A given correlation site shall produce a maximum correlation site just when a given input signal has arrived in the proper time sequence. The correlation site is determined by calculating and matching the shift speeds which, by programming the switches 15, are programmed into the switching/delay cells 24.

FIGS. 6a–6d show the function of the spacetime correction in single steps in individual representations. It illustrates the operation of the signal detection unit for a 3×3 sub-unit with three signal flow chains and three adder/comparator units. FIG. 6a shows a 3×3 input image matrix consisting of three input vectors 7 and containing a straight line along the main diagonal. In the left signal flow chain, the switch of the lower switching/delay cell is set at OFF, and in the center signal flow chain the lower and upper switches are set at OFF and in the right signal flow chain all three switches are set on OFF. The threshold value of the comparator is set at 3. The results from the adder/comparator units form a signal vector per clock step. The sequence of the signal vectors constitutes the signal space. In FIG. 6a, the initial state is at time t=0. At this time a signal is applied to the input of the right signal flow chain. This signal is stopped during this clock step at the delay link. FIG. 6b shows the state following the first timing at t=1. As shown in FIG. 6b, the first signal path segment In the right signal flow chain is activated and by means of the connected adder input, the lower adder/comparator unit registers a 1, A signal is applied to the input side of the center signal flow chain. FIG. 6c shows the state following the second timing. By means of the shift sequence 2 in the center signal flow chain, two signal nodes are activated simultaneously and the corresponding inputs of the adder/comparator units register a 1 at these inputs, The signal wave in the right signal flow chain is shifted forward by one switching/delay cell. As a result the adder 1c of the lower cell emits a 1, the adder 1b of the center cell emits a 2, because two adder inputs are simultaneously actuated, A signal is applied at the input side to the left signal flow chain. FIG. 6d shows the state following the timing at t=3. The middle and right signal waves have reached the output 3b,c of the signal flow chain. By means of the shift sequence 3, the signal wave of the left signal flow chain propagates at a higher speed and simultaneously with the other two actuates the upper adder C1a. The upper adder 1a counts a 3 and the result 1 at the comparator output therefore indicates that at time t=3 a straight line with a slope of 45E was detected.

FIG. 4 is considered again to elucidate the multi-coincidence unit.

The adder/comparator units of the upper signal detection unit C1a emit one signal vector per clock step, said vector showing which signals at time t were received at the input channels 9a,ac and then were detected. The lower signal detection unit C1b indicates which signals were received at time t at the input channels 9b,a–c and then were detected. In order to determine the signal transit-time differentials of the signals at the channels 9a,a–c and 9b, a–c, the two generated sets of signal vectors are correlated by forming all possible pairs of signal vector combinations and by carrying out the correlations pairwise using coincidence circuits.

Signals of the same signal shape are made to coincide in the multi-coincidence unit C2. A set of antiparallel flipflop chains of the multi-coincidence unit C2 are used to form the combination pairs of signals vectors. The multi-coincidence circuit is implemented by pairwise linking the memory flipflops of the particular antiparallel pair of flipflop chains of the same signal shape using AND gates 20. The set of signal vectors of the upper input channels 9a,a–c is applied at one side of the flipflop chains. The set of signal vectors of the lower input channels 9b,a–c is applied to the other side of the flipflop chains. One signal vector per clock step is fed in each case to the two lateral inputs of the flipflop chains. The signal vectors pass through the flipflop chains in opposite directions. The signal vectors meet each other for the first time at the center of the flipflop chains. The AND gate in the center, lower pair of flipflop chains produces transit-time differential t0–t0' at the sampling time t and the transit time differential t1–t1' at the sampling time t+1, where t0 is the first sampling time at the input 1 and t0' is the first sampling time at the input 2. At the sampling time t+1, the signal vectors have been shifted by one flipflop chain position to the left and right resp. There are three coincidence pairs (t2–t0', t1–t1', t0–t2') at the sampling time t+1. After n clock steps the flipflop chains for the first time have been crossed and n coincidences take place. The number of coincidence pairs is determined by the length of the flipflop chains and the number of the flipflop chain pairs.

The apparatus can be technically designed with digital switching circuits, and the signal detection unit and the multi-coincidence unit can be built separately from each other. The multi-coincidence unit can be designed using conventional electronics. Because of the manifold replication of the three basic elements used and because of its simple connection topology, the signal detection unit can be converted into a structured VLSI design and can be implemented in an application-specific, integrated switching circuit.

Figure 7:
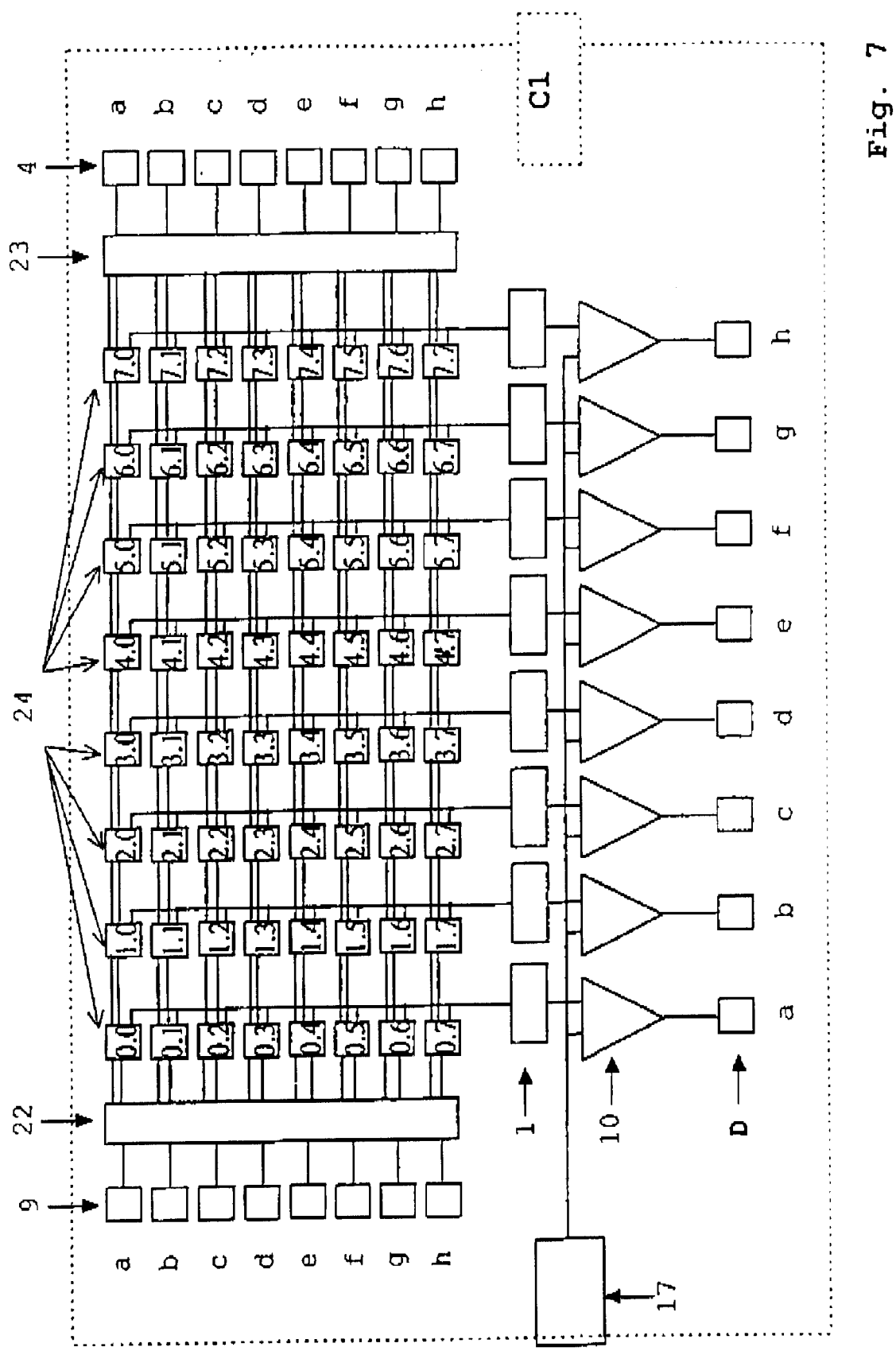
FIG. 7 shows the VLSI circuit of the apparatus of the invention.

FIG. 7 illustrates a functional block diagram of a signal detection unit C1 comprising 8 input channels 9a–h, 8 switching/delay links (horizontal connections between 9a–h and 4a–h) consisting each of 8 switching/delay cells 24, of 8 output channels 4a–h and 8 adder/comparator units emitting an 8-part output vector D.

In an advantageous embodiment of the method and apparatus of the invention, the processor is fitted at its input side with a demultiplexer 22 whereby either signal data or the bit sequences can be loaded to program the switch positions. The multiplexer 23 at the right-hand output also relays either signal data or the bit sequences. The processor is composed of two functional components: the 8 parallel signal flow chains and the 8 parallel adder/comparator units configured perpendicularly thereto. The connections of the n signal flow chains and m adder/comparator units constitute a matrix of n rows and m columns. The processor topology is linear. Accordingly the processor can be technically built up from several identical replications of the same basic row. Each row consists of an adder/comparator unit with 8 inputs and 8 settable switching/delay cells 24 with their assigned memory flipflops in order to program each switching/delay cell 24. The signal flow chains, which are formed by the signal paths of the switching/delay cells of the consecutive cells, make contact with each other. The memory flipflops of the switches 15 are sequential in each signal flow chain and form a loadable flipflop chain. When the chips are initialized, the 8 flipflop chains are loaded in parallel in 8 clock steps by means of bit-serial shifting the bit sequences specifying the switch positions.

The adder 1 counts all the adjusted signal outputs of one row and feeds the result to the connected comparator 10 or directly to the output. This branching option is programmable by a preceding demultiplexer 22. When the result is applied to the comparator input, the comparator-input result is compared with a programmed threshold value 17 applied to the second comparator input. A signal vector of length 8 is emitted per clock step at the comparator outputs.

In another advantageous implementation of the method and apparatus of the invention, the signal flow chains can be cascaded in multichip manner. By adding further chips containing further adder/comparator units, the signal space is made scalable.

If only one chip C is used, then, in operation, by consecutively switching between pattern loading and recognizing the last loaded pattern, it will be possible also to recognize consecutively patterns of different signal waveforms. Illustratively this feature is applicable to loading acoustic patterns and recognizing them and thereupon loading optical patterns and recognizing these.

Where several chips or systems are used, as many different types of signals can be simultaneously recognized as there are chips. If optical and acoustic patterns must be recognized simultaneously, two chips will be required. In this manner an advantageous implementation of the method and apparatus of the invention allows detecting the simultaneous presence of a combined image-sound pattern coasting of an optical and an acoustic pattern.

| Reference List | |
| --- | --- |
| signal source | A |
| signal pre-processing stage | B |
| signal converter | B1 |
| A/D converter | B2 |
| input-vector generator | B3 |
| chip | C |
| signal detection unit | C1 |
| multi-coincidence unit | C2 |
| output vector | D |
| adder | 1 |
| analog signal | 2 |
| output | 3 |
| output channel | 4 |
| bit flow | 5 |
| digital signal | 6 |
| input vector | 7 |
| input | 8 |
| input channel | 9 |
| comparator | 10 |
| microphone | 11 |
| register cell (flipflop chain) | 12 |

-continued

Reference List

| | |
|---|---|
| register cell, active/inactive | 13a/i |
| programmable switch | 15 |
| shift register | 16 |
| threshold value | 17 |
| signal | 18 |
| signal/active/inactive | 19a,/i |
| AND gate | 20 |
| delay element | 21 |
| demultiplexer (DMUX) | 22 |
| multiplexer (MUX) | 23 |
| switching/delay cell | 24 |

What is claimed is:

1. A method to segment-wise detect and bring into coincidence signal waveforms which can be converted into monotone and continuous trajectories for real-time pattern recognition, localization and monitoring optical and acoustic signals and to determine transit-time differentials, wherein pre-programmed key signals are detected by sampling the signals, data is correlated from the sampled signals, and pairs of signal combinations of given signal transit-time differentials from the coincidence of the detected signals are determined, the method comprising:

sampling the signal waveforms in a sequence of input vectors (7) at an input side, wherein each input vector (7) consecutively passes through a signal detection unit (C1), the signal detection unit (C1) comprising parallel, programmable signal-flow chains having consecutively mounted switching/delay units (15, 21, 24), and adder/comparator units (1, 10) which are situated at signal nodes equidistantly along and perpendicularly to the signal-flow chains, each adder/comparator (1, 10) having an adder (1), and a comparator (10), triggering a signal wavefront evoked by an inciding signal along the signal-flow chains, controlling the speed of propagation of the signal through the signal-flow chains, determining a correlation result by summing states of the signal nodes of the adder/comparator units (1, 10) perpendicularly to a direction of propagation in each signal detection unit, comparing the correlation result of the comparator (10) with a programmable threshold value (17), generating a standard pulse when the threshold value (17) is exceeded, passing the standard pulses of all adder/comparator units (1,10) through a multi-coincidence unit (C2), wherein the multi-coincidence unit (C2) comprises antiparallel pairs of delay chains defining a delay path for the standard pulses, and generating a coincidence when two opposite standard pulses impact each other by use of AND gates (20) mounted equidistantly along the delay path, and producing the transit-time differential of the signal (18) using time and a particular spatial position of said coincidence along the delay path.

2. The method of claim 1, wherein a number of signals are sampled, and a set of transit-time differentials of various signals (18) are determined in parallel and the set of signal transit-time differentials is emitted per clock step.

3. The method of claim 2, comprising programming a set of different, pre-defined key signals using flipflop setted switches in the signal-flow chains.

4. The method of claim 3, wherein signal propagation speeds in the signal flow chains are programmable.

5. The method of claim 4, wherein a maximum transit-time differential interval and a sub-division of the transit-time differential interval are programmable.

6. The method of claim 5, characterized in that bit flows as adder results are selectively emitted as signals (18) for processing in the multi-coincidence unit (C2).

7. The method of claim 6, wherein after a programmed signal pattern is recognized, new programmed signal patterns are employed to detect new signal patterns.

8. The method of claim 7, wherein the multi-coincidence unit (C2) and signal detection units (Cl) are arranged on one chip, and at least two chips are provided in a multi-cascade configuration whereby the at least two chip configuration allows simultaneous pattern recognition of different signals and their coincidence, the different signals including optical and acoustical signals.

9. An apparatus to segment-wise detect and bring into coincidence signal waveforms, which can be converted into monotone and continuous trajectories for real-time pattern recognition, localization and monitoring of optical and acoustic signals, and to determine transit-time differentials, wherein pre-programmed key signals are detected by sampling the signals, data is correlated from the sampled signals, and pairs of signal combinations as signal transit-time differentials from the coincidence of the detected signals are determined, the apparatus comprising:

(a) at least two receivers sampling incoming acoustic signals and generating sequences of digital values from the incoming acoustic signals, (b) a vector generator for each receiver for converting the sequences of digital values into sequences of input vectors (7), (c) a signal detection unit (C1) downstream from each vector generator and comprising parallel, programmable signal-flow chains and adder/comparator units (1, 10) mounted perpendicularly to the signal-flow chains at equidistant spacings, each adder/comparator unit each time picking up a signal state of the signal-flow chains at a signal node in the signal-flow chain, each adder/comparator unit having a predetermined threshold value (17) to generate a time standard pulse when the threshold value (17) is exceeded, and (d) a multi-coincidence unit (C2) consisting of two anti-parallel shift-register forming flipflop chains, each chain being combined pairwise by connecting the pairs of flipflop chains with an AND gate (20) in such a way that the impact of two opposite standard pulses along the shift-register chains triggers a timed standard pulse which by a predetermined timing point and a particular spatial position along the shift-register chains, a signal transit-time differential is encoded.

10. The apparatus of claim 9, characterized in that the each signal flow chain has an array of switching/delay cells (24).

11. The apparatus of claim 10, wherein the signal flow chains are programmable by varying switch positions in the switching/delay cell (24).

12. The apparatus of claim 10, wherein each switching/delay cell (24) can be programmed by an assigned flipflop.

13. The apparatus of claim 12, wherein the signal pattern is programmable by setting the flipflop in the signal flow chains.

* * * * *